United States Patent
Lan

(10) Patent No.: US 6,742,791 B2
(45) Date of Patent: Jun. 1, 2004

(54) STROLLER WITH SPRING-BIASED BRAKE PINS

(76) Inventor: Red Lan, 15F, No. 108, Sec.1, Hsin Tai 5th Rd., Hsichih, Taipei Hsien (TW)

(*) Notice: Subject to any disclaimer, the term of this patent is extended or adjusted under 35 U.S.C. 154(b) by 89 days.

(21) Appl. No.: 10/222,423

(22) Filed: Aug. 16, 2002

(65) Prior Publication Data

US 2003/0057681 A1 Mar. 27, 2003

(30) Foreign Application Priority Data

Sep. 27, 2001 (GB) .............................................. 0123348

(51) Int. Cl.⁷ .............................................. B62D 61/06
(52) U.S. Cl. ....................... 280/62; 280/642; 280/47.38; 188/20
(58) Field of Search ................................ 280/642, 643, 280/647, 648, 649, 650, 651, 658, 47.38, 47.4, 644, 62, 33.994; 188/17, 19, 20, 26

(56) References Cited

U.S. PATENT DOCUMENTS

| | | | | |
|---|---|---|---|---|
| 5,373,917 A | * | 12/1994 | Kamman | 188/1.12 |
| 5,460,399 A | * | 10/1995 | Baechler et al. | 280/650 |
| 6,170,615 B1 | * | 1/2001 | Cheng | 188/20 |
| 6,308,805 B1 | * | 10/2001 | Lan | 188/20 |
| 6,341,672 B1 | * | 1/2002 | Yang et al. | 188/20 |
| 6,408,990 B1 | * | 6/2002 | Chen | 188/20 |
| 6,443,468 B1 | * | 9/2002 | Eros | 280/47.38 |
| 6,561,537 B1 | * | 5/2003 | Chen | 280/648 |

FOREIGN PATENT DOCUMENTS

| | | | |
|---|---|---|---|
| GB | 2197042 | * | 5/1988 |
| GB | 2243198 | * | 10/1991 |

* cited by examiner

*Primary Examiner*—Bryan Fischmann
(74) *Attorney, Agent, or Firm*—Brinks Hofer Gilson & Lione

(57) ABSTRACT

A stroller includes a frame assembly with a pedal-mounting rod, on which a brake pedal is mounted rotatably. When the brake pedal is turned downward, a coupling mechanism activates two resilient elements to bias two brake pins to project from two pin holes in two mounting seats. At this time, in case the brake pins are aligned with two of a plurality of brake holes in two rear wheels, they are biased into the two brake holes. In case the brake pins are deflected from all of the brake holes, they are biased to press against the surfaces of the rear wheels. Under such conditions, the rear wheels are rotated slowly by pushing the stroller so as to permit the brake pins to be biased into two of the brake holes.

8 Claims, 10 Drawing Sheets

STROLLER WITH SPRING-BIASED BRAKE PINS

CROSS REFERENCE TO RELATED APPLICATION

This application claims priority to United Kingdom application no. 0123348.5, filed Sep. 27, 2001.

BACKGROUND OF THE INVENTION

1. Field of the Invention

This invention relates to a stroller, and more particularly to a stroller with two brake pins, each of which is biased to one of a series of brake holes in a rear wheel when a brake pedal is turned downward and when the rear wheel rotates slowly.

2. Description of the Related Art

In some conventional strollers, two brake mechanisms are provided to include two brake pins, each of which is movable to engage one of a series of brake holes in the inside of a rear wheel when a brake pedal is turned downward. However, because no biasing means is employed to push the brake pins to engage the brake holes, when the brake pedal is actuated to move the brake pins toward the rear wheels, in case the brake pins contact the surfaces of the rear wheels, which are formed with the brake holes, due to deflection of the brake pins from all of the brake holes, it is necessary to rotate the rear wheels by pushing the stroller so as to align the brake pins with two of the brake holes. Subsequently, the brake pedal is actuated once again to move the ends of the brake pins into the two brake holes, thereby resulting in an inconvenient braking process.

SUMMARY OF THE INVENTION

The object of this invention is to provide a stroller with two brake pins, each of which is biased to engage one of a series of brake holes in a rear wheel when a brake pedal is turned downward and when the rear wheel rotates slowly, thereby resulting in an efficient braking process.

According to this invention, a stroller includes a frame assembly with a horizontal pedal-mounting rod, and a brake pedal. The brake pedal has a pivot portion that is disposed rotatably on the pedal-mounting rod, a foot-engaging portion that extends rearward from the pivot portion, and a control portion that extends forward from the pivot portion. A coupling mechanism includes a mounting rod that extends through the control portion, and a pair of push rods that are disposed movably on an intermediate portion of the mounting rod, that are located on two sides of the brake pedal, and that are capable of moving outward away from each other when the brake pedal is turned downward. Each of the push rods has a coupling end that is distal to the brake pedal. Each of two rear wheels includes a plurality of holes that are arranged along a circle, and an axle that is disposed at the center of the circle. Each of two brake mechanisms includes a mounting seat that is mounted to a respective end of the mounting rod and that is formed with a pin hole, a brake pin that is disposed movably within the pin hole in the mounting seat, and a resilient element. The push rods are connected respectively and movably to the mounting seats. The axles of the rear wheels are journalled respectively on the mounting seats. Each of the resilient elements has a spring force-storing portion mounted to a respective one of the mounting seats, a rod-engaging portion that engages the coupling end of the respective one of the push rods so as to be moved relative to the respective one of the mounting seats by the respective one of the push rods, and a pin-driving portion that moves a respective one of the brake pins to engage one of the holes in a respective one of the rear wheels when the brake pedal is turned downward, thereby preventing rotation of the respective one of the rear wheels relative to the mounting seats.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
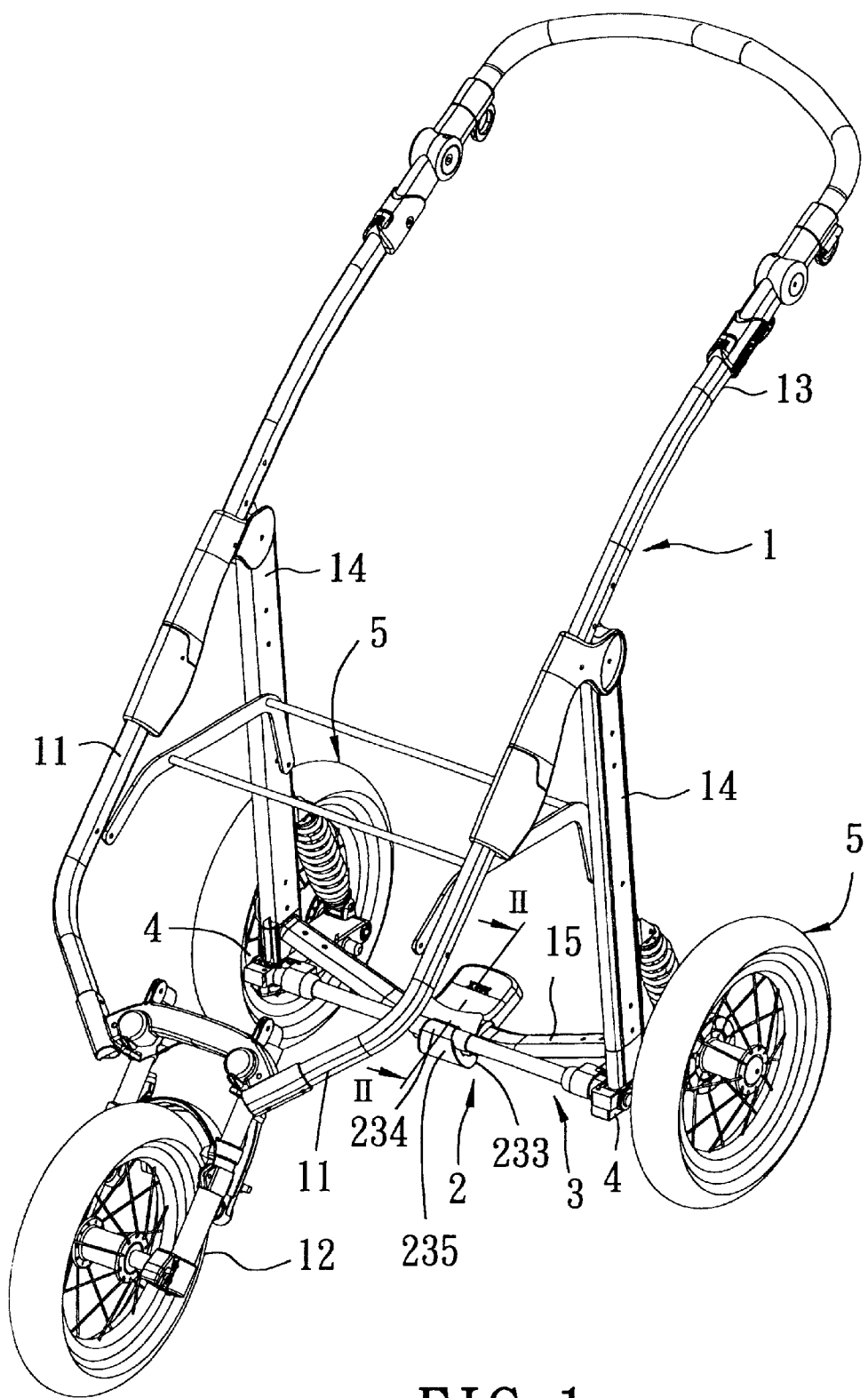
FIG. 1 is an assembled perspective view of the preferred embodiment of a stroller according to this invention.
Figure 2:
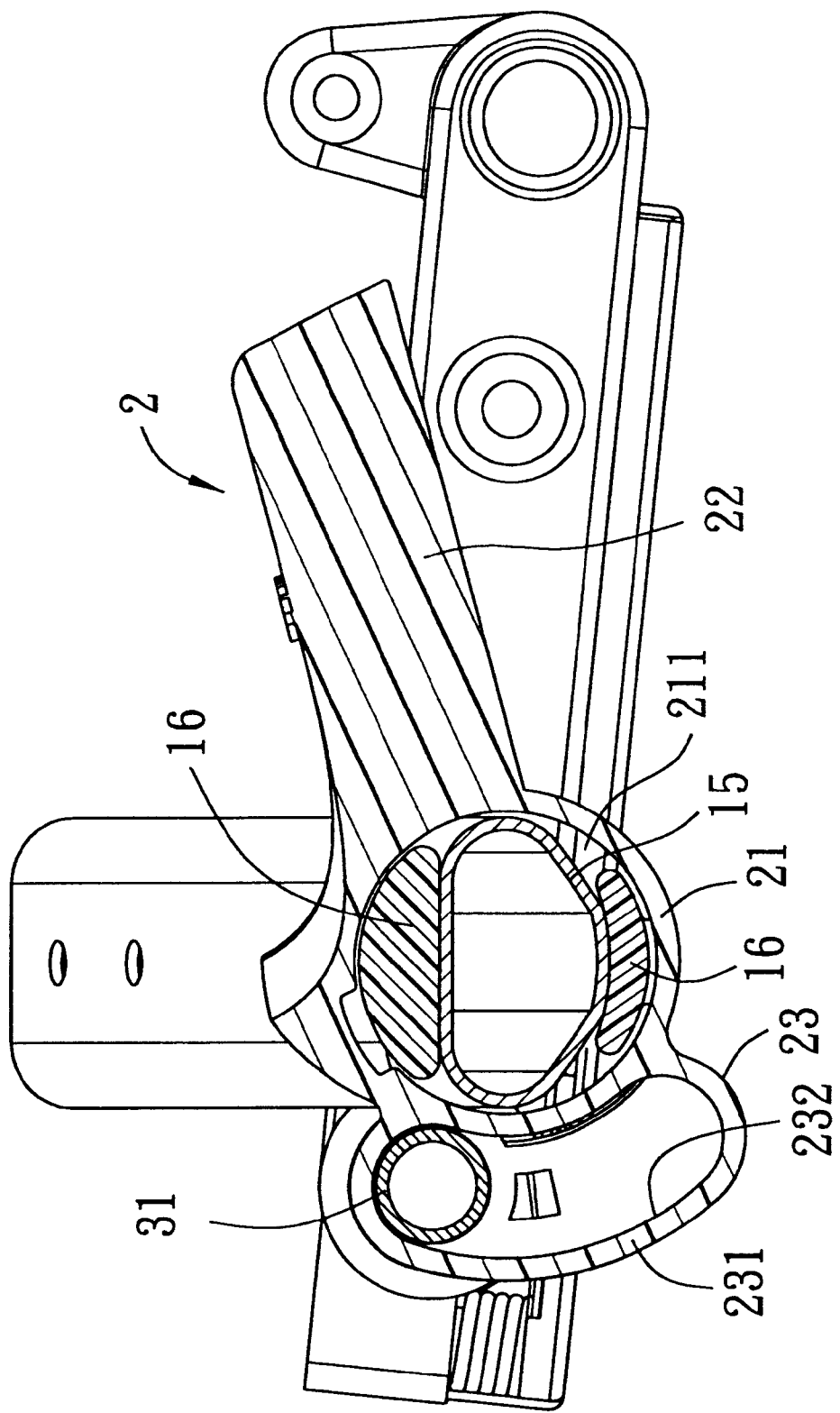
FIG. 2 is a sectional view taken along Line II—II in FIG. 1.

Referring to FIGS. 1 and 2, the preferred embodiment of a stroller according to this invention is shown to include a frame assembly 1, a brake pedal 2, a coupling mechanism 3, a pair of left and right brake mechanisms 4, and a pair of left and right rear wheels 5, each of which is provided with a hub 51.

The frame assembly 2 has an aligned pair of inclined left and right lower rods 11, a front wheel unit 12 that is disposed between the left and right lower rods 11, a handle unit 13 that is connected to the upper ends of the lower rods 11, two generally vertical rear supporting rods 14 that are connected pivotally to the handle unit 13 at the upper ends thereof, and a pedal-mounting rod 15 that is connected to the lower ends of the rear supporting rods 14 at two ends thereof. Two mounting blocks 16 are fixed respectively to the upper and lower ends of a middle portion of the pedal-mounting rod 15, thereby permitting sleeving of the brake pedal 2 thereon.

Figure 2A:
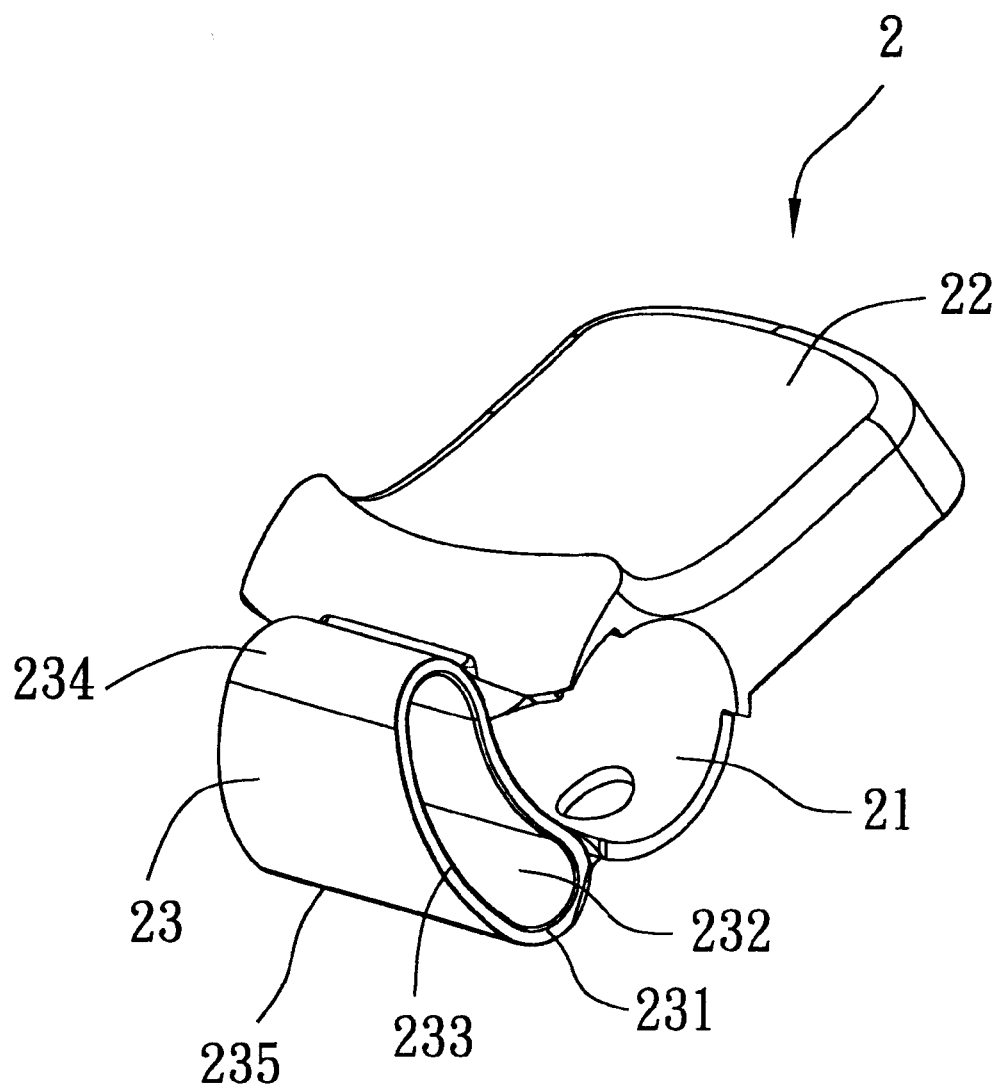
FIG. 2A is a perspective view of a brake pedal of the preferred embodiment.

The brake pedal 2 has a pivot portion 21 that is sleeved rotatably on the pedal-mounting rod 15, a foot-engaging portion 22 that extends rearward from the pivot portion 21, and a tubular control portion 23 that extends forward from the pivot portion 21. The pivot portion 21 is formed with a hole 211, through which the assembly of the pedal-mounting rod 15 and the mounting blocks 16 extends. The control portion 23 has a surrounding wall 231 (see FIG. 2A) that defines a hole 232 (see FIG. 2A), two pushing surfaces 233 (see FIG. 2A) that are formed at two ends of the surrounding wall 231, a small-width upper portion 234 (see FIG. 2A), and a large-width lower portion 235 (see FIG. 2A). The width of the control portion 23 increases gradually and downwardly from the upper portion 234 to the lower portion 235.

Figure 3:
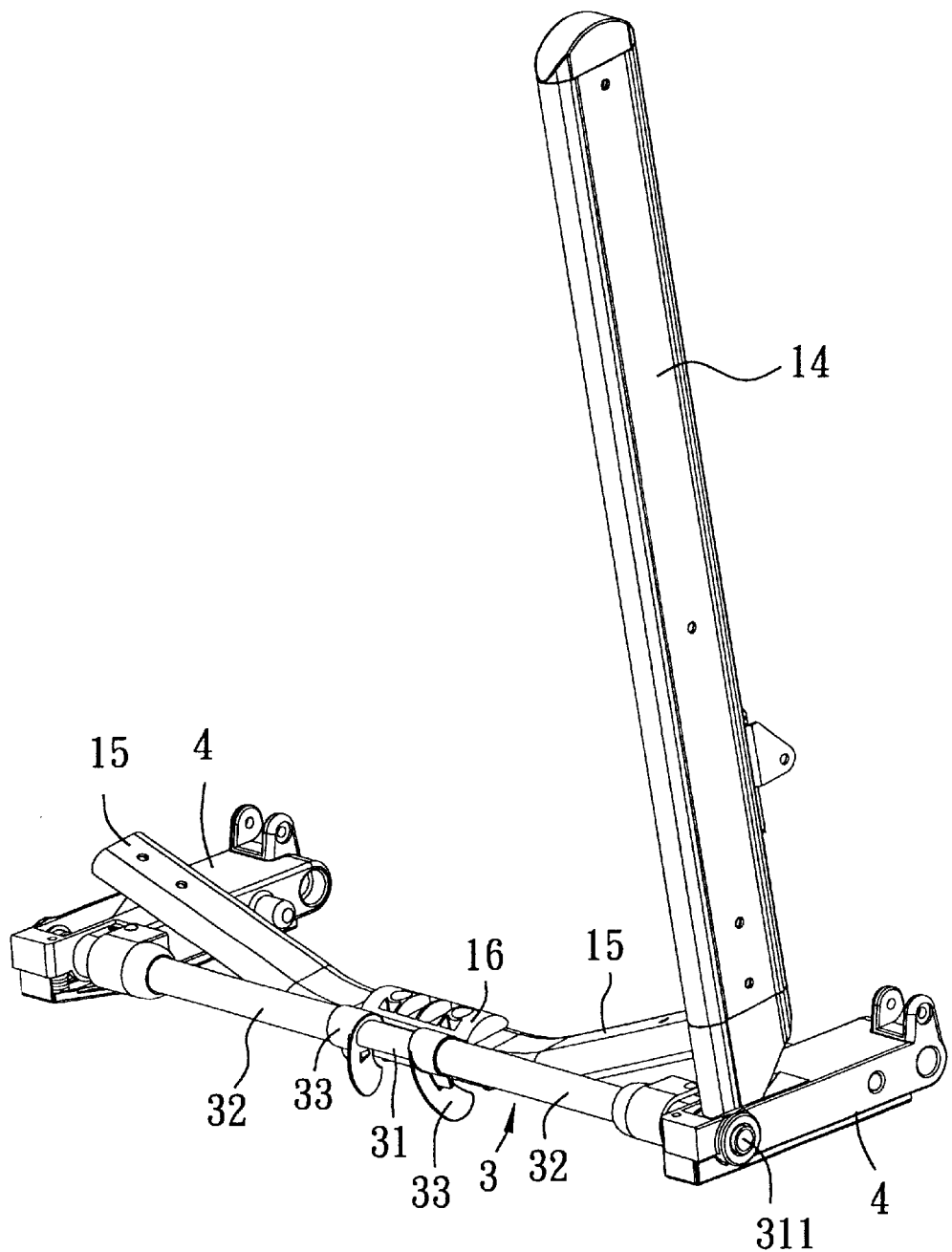
FIG. 3 is an assembled fragmentary perspective view of the preferred embodiment, in which the brake pedal is removed for the sake of brevity.
Figure 3A:
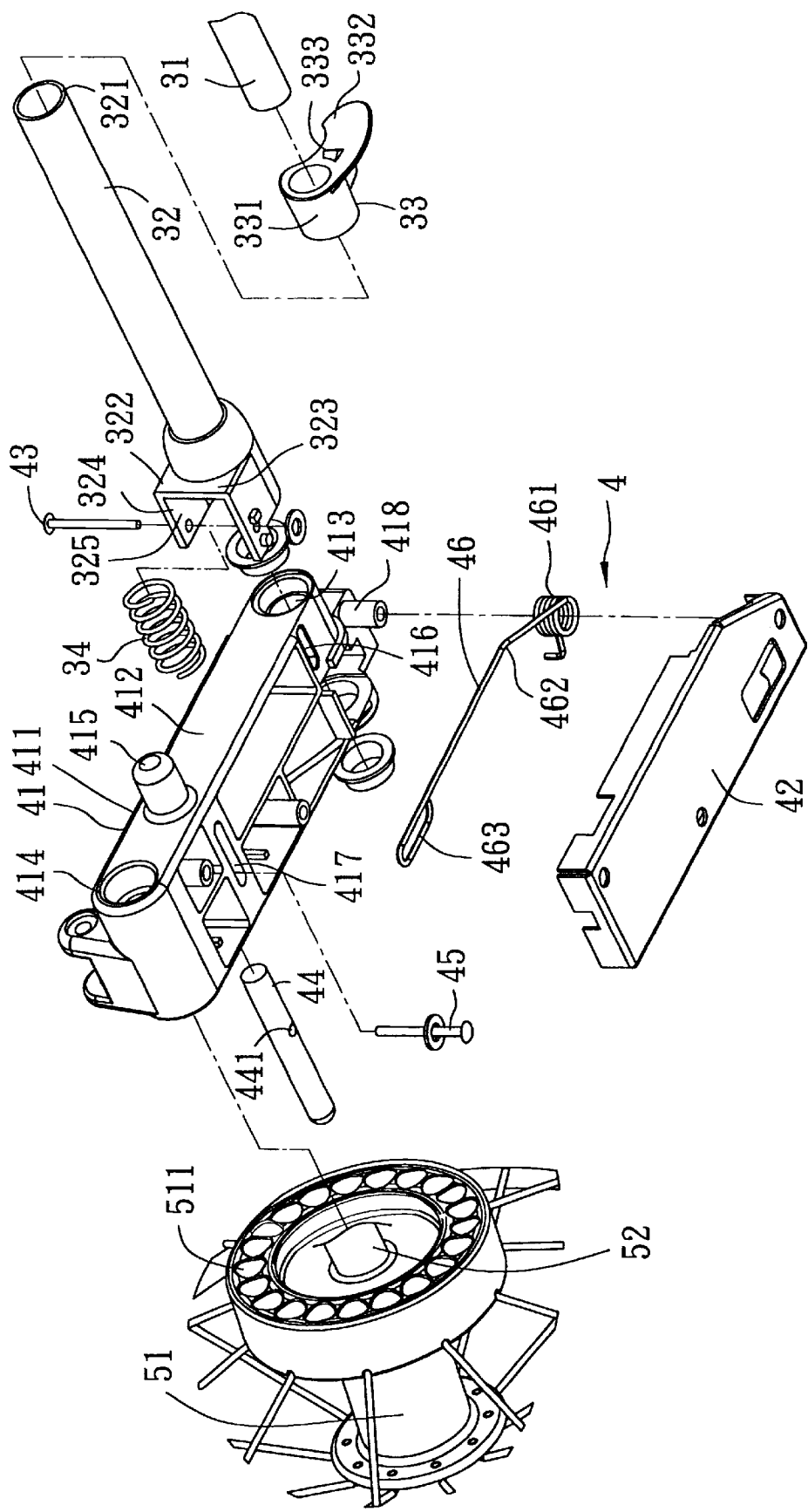
FIG. 3A is a partly exploded fragmentary perspective view of one coupling mechanism, one brake mechanism, and one rear wheel of the preferred embodiment.
Figure 4:
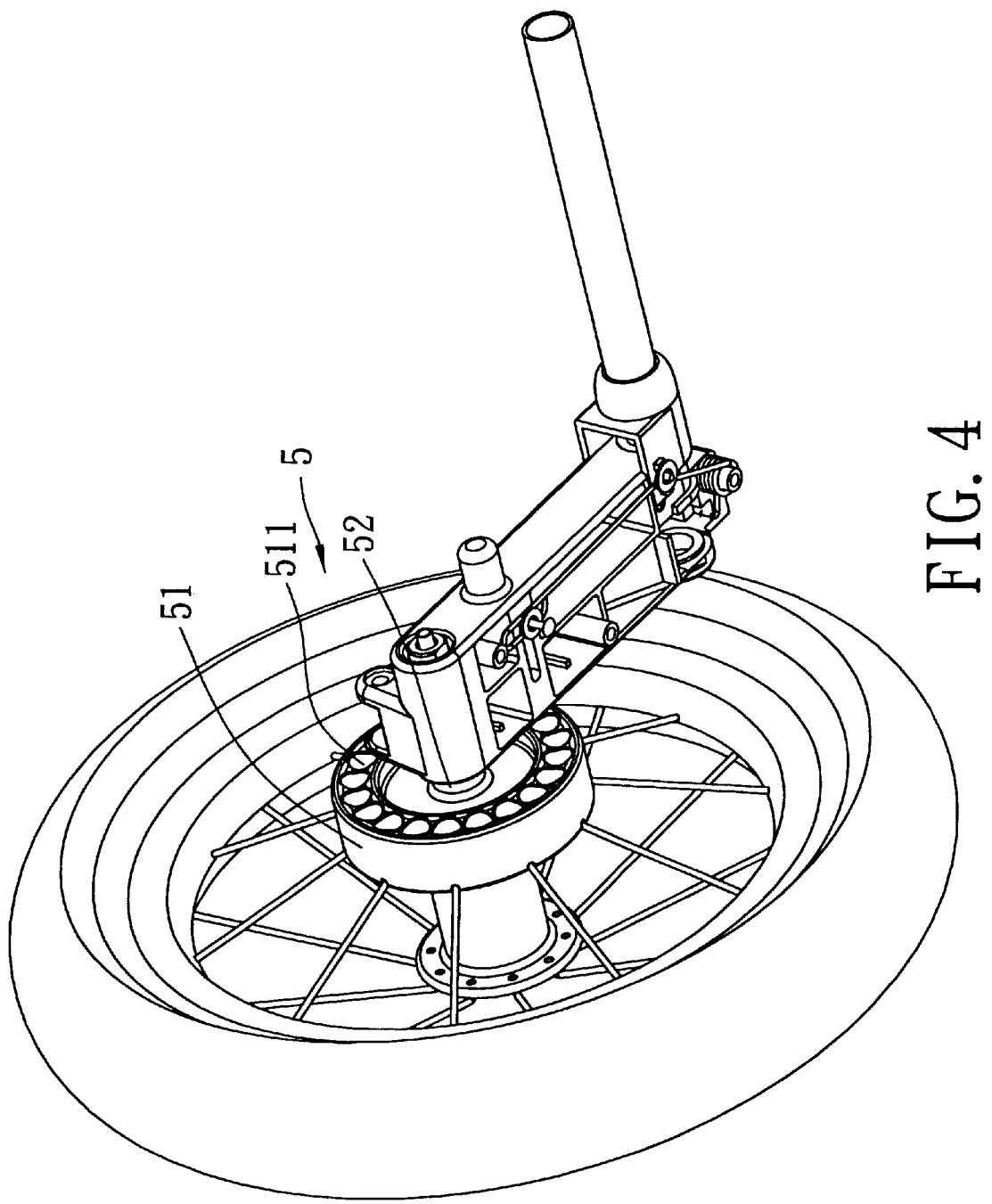
FIG. 4 is an assembled fragmentary perspective view of the coupling mechanism, the brake mechanism, the rear wheel of the preferred embodiment.

Referring to FIGS. 3, 3A, and 4, the coupling mechanism 3 includes a mounting rod 31 that extends through the hole 232 in the control portion 23 of the brake pedal 2, and a pair of push rods 32 that are disposed movably on the middle portion of the mounting rod 31, and that are located on two sides of the brake pedal 2. Each of the push rods 32 has a driven end 321 that is proximate to the control portion 23 of the brake pedal 2, and a coupling end 322 that is opposite to the driven end 321 and that includes a vertical wall 323, two aligned horizontal walls 324 that extend respectively and integrally from the upper and lower ends of the vertical wall 323, and a receiving chamber 325 that is defined among the vertical wall 323 and the horizontal walls 324. Two limiting seats 33 are fixed respectively to the driven ends 321 of the push rods 32, and are adjacent to the brake pedal 2. Each of the limiting seats 33 has a sleeving portion 331 that is sleeved fixedly on the corresponding push rod 32, and a rearwardly and outwardly inclined limiting plate 332 that extends integrally from the sleeving portion 331. Two springs 34 are disposed between the push rods 32 and the brake mechanisms 4 so as to bias the limiting plates 332 to press against two opposite sides of the control portion 23 of the brake pedal 2. As such, downward turning of the brake pedal 2 results in rotation of the control portion 23 about the pedal-mounting rod 15 so as to engage the lower portion 235 of the control portion 23 with the limiting plates 332, thereby moving the push rods 32 outwardly. Each of the limiting plates 332 is formed with a stop projection 333, which engages the corresponding pushing surface 233 of the control portion 23 when the brake pedal 2 is turned downward, thereby preventing further rotation of the brake pedal 2 about the pedal-mounting rod 15.

Each brake mechanism 4 includes a mounting seat 41 that is mounted to a respective end of the mounting rod 31, a bottom cover 42 that is fixed to the mounting seat 41, a vertical front positioning pin 43, a horizontal brake pin 44, a vertical rear positioning pin 45, and a resilient element 46. The structure and operation of the coupling mechanism 3, one brake mechanism 4, and one rear wheel 5 will be described hereinafter.

The mounting seat 41 has an elongated horizontal top wall 411, a pair of vertical left and right side walls 412 that extend respectively and integrally from two opposite sides of the top wall 411, a transverse front rod hole 413, through which the end 311 of the mounting rod 31 of the coupling mechanism 3 extends, and a transverse rear axle hole 414, within which an axle 52 of the rear wheel 5 is journalled. The spring 34 is sleeved on the mounting rod 31, and is received within the front rod hole 413 so as to bias the push rod 32 toward the brake pedal 2. A transverse pin hole 415 is formed in the mounting seat 41 between the front rod hole 413 and the rear axle hole 414. A transverse front slide slot 416 is formed through a front portion of the mounting seat 41, and has two closed ends. The front positioning pin 43 extends through the front slide slot 416 and the horizontal walls 324 of the push rod 32, thereby permitting movement of the push rod 32 relative to the mounting seat 41 in the transverse direction of the mounting seat 41. A transverse rear slide slot 417 is formed in a rear portion of the mounting seat 41 under the rear axle hole 414, has two closed ends, and is in communication with the rear axle hole 414. The rear positioning pin 45 extends through the rear slide slot 417 and into a vertical hole 441 in the brake pin 44.

The resilient element 46 has a spring force-storing portion 461, a rod-engaging portion 462, and a pin-driving portion 463. The spring force-storing portion 461 is coiled, and is sleeved on a fixed positioning post 418 of the mounting seat 41. The rod-engaging portion 462 engages the coupling end 322 of the push rod 32 so that the push rod 32 can push the rod-engaging portion 462 to move relative to the mounting seat 41. The pin-driving portion 463 is sleeved on the brake pin 44 so as to push the same to engage one of a series of brake holes 511, which are formed in the inner side surface of the rear wheel 51 and which are arranged along a circle that is located around the axle 52, thereby preventing rotation of the rear wheel 51. The axle 52 is located at the center of the circle.

Figure 5:
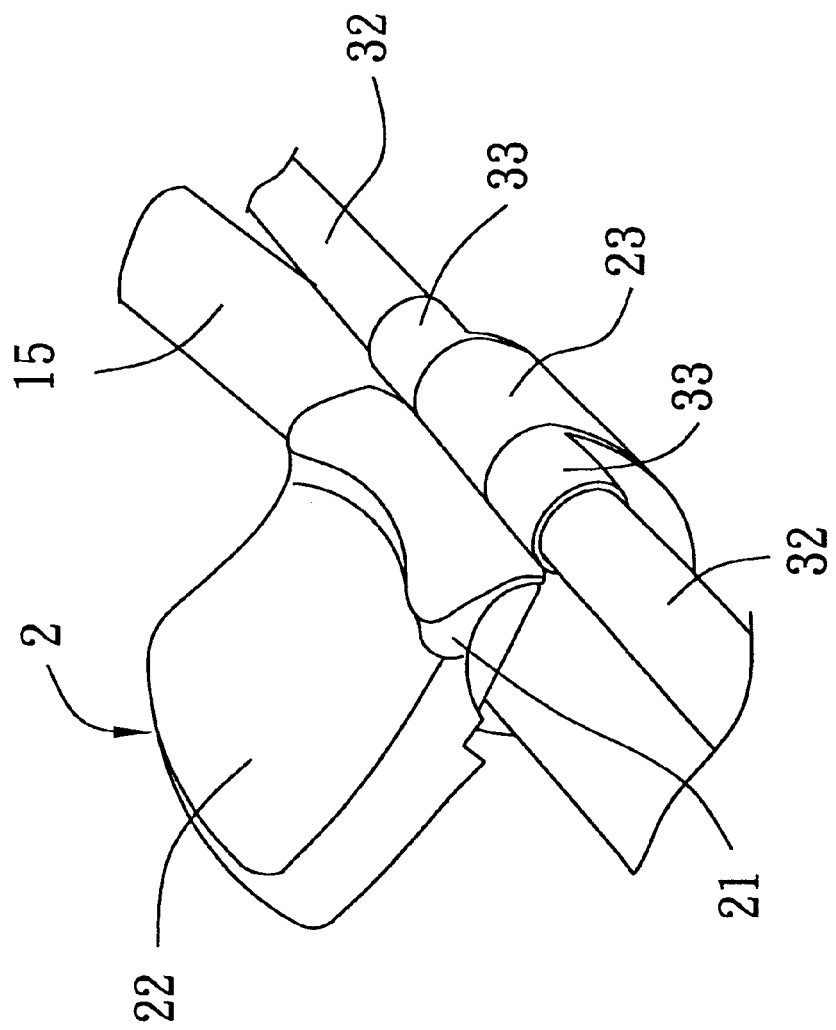
FIG. 5 is an assembled fragmentary perspective view of the brake pedal and the coupling mechanism when the brake pedal is disposed at a normal position and when viewed from the bottom.
Figure 6:
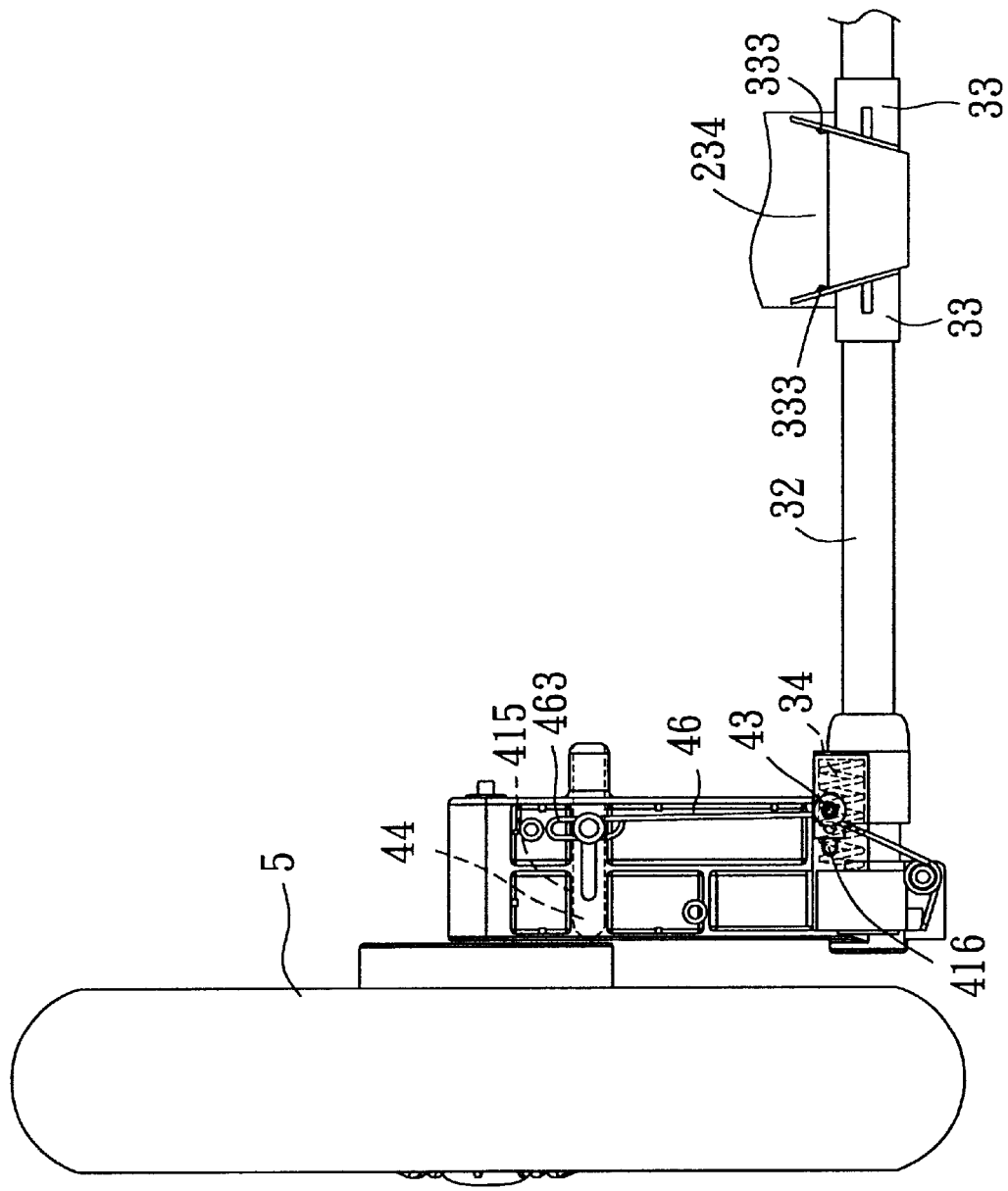
FIG. 6 is a schematic fragmentary bottom view of the preferred embodiment, illustrating relative positions among the movable parts of the coupling mechanism and the brake mechanism when the brake pedal is disposed at the normal position.

Referring to FIGS. 1, 5, and 6, when the brake pedal 2 is disposed at its normal position, the small-width upper portion 234 of the control portion 23 is located between the limiting seats 33. Because the springs 34 (see FIG. 3A) press the limiting seats 33 against the small-width upper portion 234 of the control portion 23, the front positioning pins 43 are located at the inner ends of the front slide slots 416 such that the brake pins 44 are biased inward by the resilient elements 46 to retract into the pin holes 415.

Referring to FIGS. 1, 3A, 7, and 8, when it is desired to brake the stroller, the brake pedal 2 is turned downward so as to rotate the large-width lower portion 235 to a position between the limiting seats 33, where the lower portion 235 contacts the stop projections 333 of the limiting seats 33, thereby preventing further rotation of the brake pedal 2. As such, the limiting plates 332 are pushed outward by the pushing surfaces 233 against the biasing action of the springs 34 (see FIG. 3A) so that the front positioning pins 43 move outward within the front slide slots 416 (see FIG. 3A), thereby moving outward the rod-engaging portions 462 (see FIG. 3A) and the pin-driving portions 463. Accordingly, the brake pins 44 are pushed by the pin-driving portions 463 to project from the pin holes 415 (see FIG. 3A). At this time, in case the brake pins 44 are aligned with two of the brake holes 511, they are inserted into the same. In case the brake pins 44 are deflected from all of the brake holes 511, they are biased by the pin-driving portions 463 to press against the surfaces of the rear wheels 5, which are formed with the brake holes 511. Under such conditions, the rear wheels 5 are rotated slowly by pushing the stroller so that the brake pins 44 are biased into two of the brake holes 511.

Figure 7:
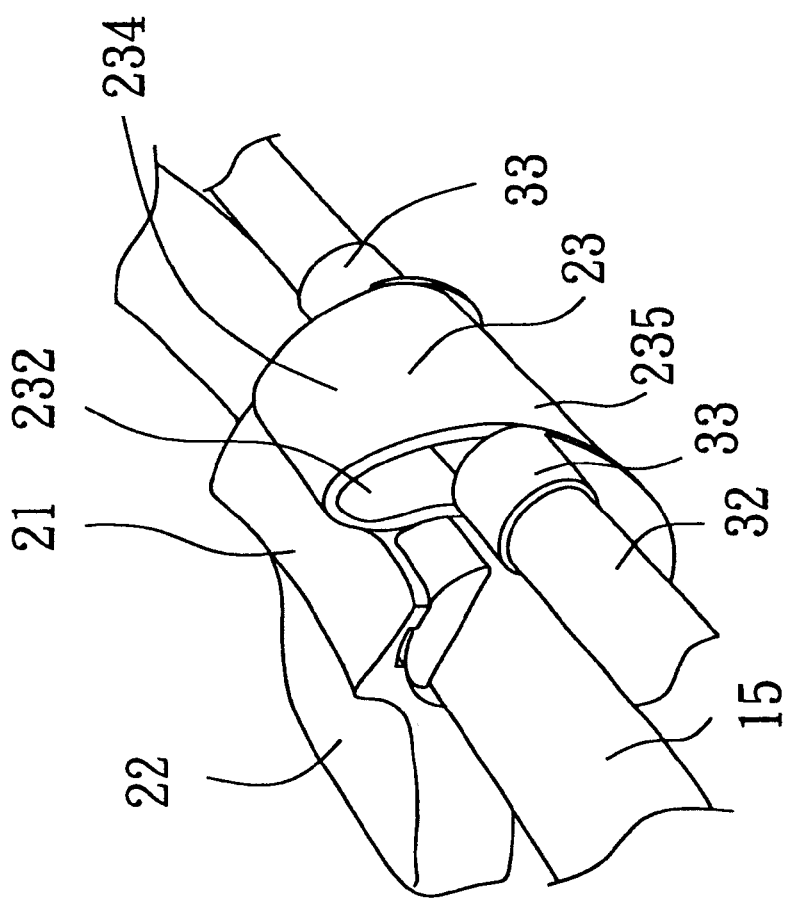
FIG. 7 is an assembled fragmentary perspective view of the brake pedal and the coupling mechanism when the brake pedal is disposed at a locking position and when viewed from the bottom.
Figure 8:
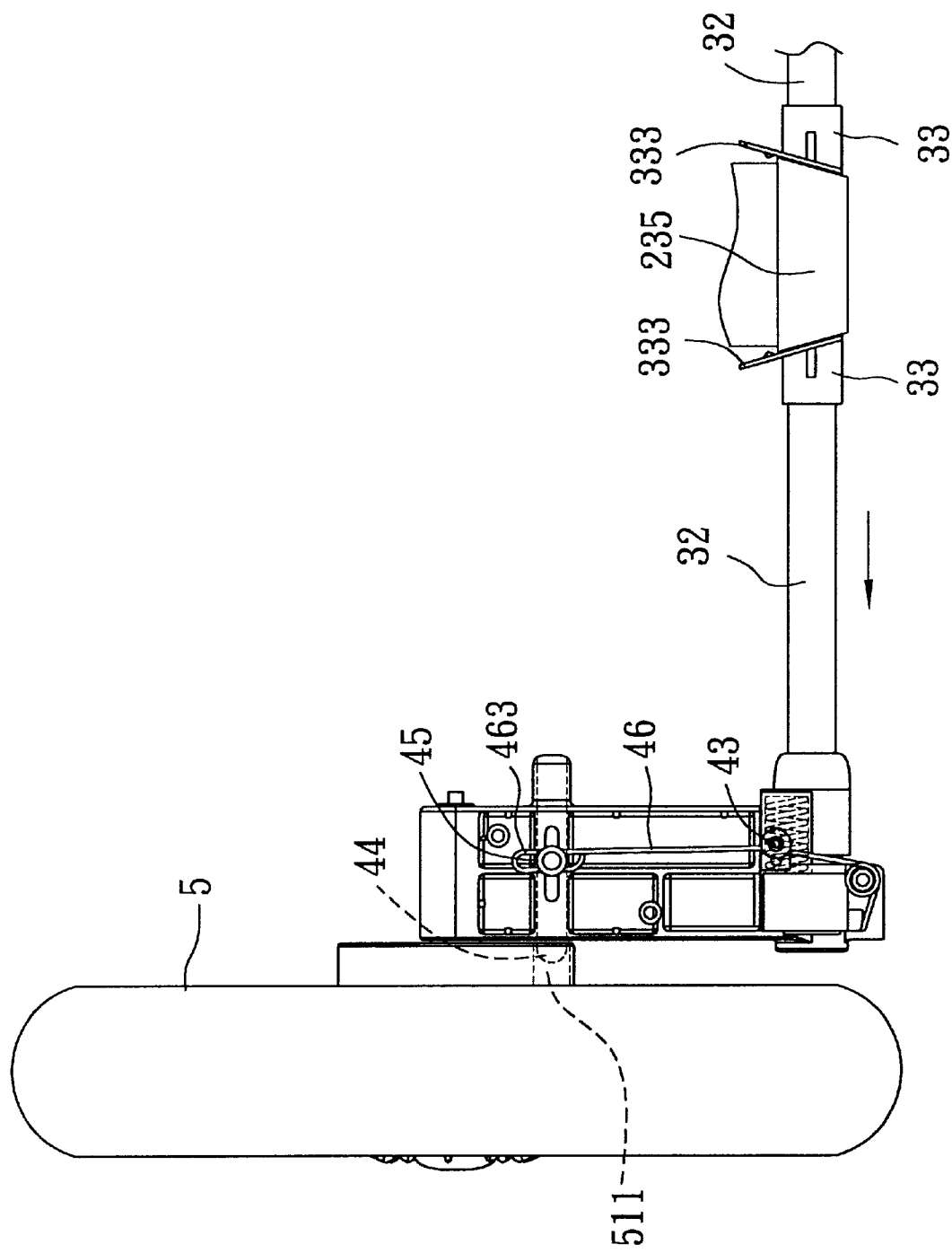
FIG. 8 is a schematic fragmentary bottom view of the preferred embodiment, illustrating relative positions among the movable parts of the coupling mechanism and the brake mechanism when the brake pedal is disposed at the locking position.

Because the springs 34 press the limiting seats 33 against the control portion 23 of the brake pedal 2, the brake pedal 2 can be positioned at the locking position shown in FIGS. 7 and 8. The brake pedal 2 can be easily rotated from the locking position to the normal position shown in FIGS. 5 and 6 in view of the fact that the force of the springs 34 to press the limiting seats 33 against the control portion 23 of the brake pedal 2 is relatively small.

With this invention thus explained, it is apparent that numerous modifications and variations can be made without departing from the scope and spirit of this invention. It is therefore intended that this invention be limited only as indicated by the appended claims.

I claim:

1. A stroller comprising:

a frame assembly including a horizontal pedal-mounting rod;

a brake pedal having a pivot portion that is disposed rotatably on said pedal-mounting rod, a foot-engaging portion that extends rearward from said pivot portion, and a control portion that extends forward from said pivot portion;

a coupling mechanism including a mounting rod that extends through said control portion, and a pair of push rods that are disposed movably on an intermediate portion of said mounting rod, that are located on two sides of said brake pedal, and that are capable of moving outward away from each other when said brake pedal is turned downward, each of said push rods having a coupling end that is distal to said brake pedal;

two rear wheels, each of which includes a plurality of holes that are arranged along a circle, and an axle that is disposed at a center of said circle; and two brake mechanisms, each of which includes a mounting seat that is mounted to a respective end of said mounting rod and that is formed with a pin hole, a brake pin that is disposed movably within said pin hole in said mounting seat, and a resilient element, said push rods being connected respectively and movably to said mounting seats, said axles of said rear wheels being journalled respectively on said mounting seats, each of said resilient elements having a spring force-storing portion that is mounted to a respective one of said mounting seats, a rod-engaging portion that engages said coupling end of the respective one of said push rods so as to be moved relative to the respective one of said mounting seats by the respective one of said push rods, and a pin-driving portion that moves a respective one of said brake pins to engage one of said holes in a respective one of said rear wheels when said brake pedal is turned downward, thereby preventing rotation of the respective one of said rear wheels relative to said mounting seats.

2. The stroller as claimed in claim 1, wherein each of said mounting seats is elongated, and includes a transverse front rod hole, through which a respective one of said ends of said mounting rod extends, and a transverse rear axle hole, within which a respective one of said axles is journalled.

3. The stroller as claimed in claim 1, wherein each of said mounting seats has a front portion that is formed with a transverse front slide slot, and a rear portion that is formed with a transverse rear slide slot, each of said front and rear slide slots having two closed ends, said coupling end of each of said push rods including a fixed vertical front positioning pin that extends through a respective one of said front slide slots, each of said rear slide slots being located under and being in communication with said pin hole, each of said brake pins having a vertical hole, each of said brake mechanisms further including a vertical rear positioning pin that extends through a respective one of said rear slide slots and into said vertical hole in a respective one of said brake pins and that contacts said pin-driving portion of a respective one of said resilient elements so as to move outward when said brake pedal is turned downward to move a respective one of said push rods outward, thereby engaging a respective one of said brake pins with said one of said holes in a respective one of said rear wheels.

4. The stroller as claimed in claim 1, wherein each of said mounting seats further includes a positioning post that is fixed thereon, said spring force-storing portion of each of said resilient elements being coiled, and being sleeved on a respective one of said posts.

5. The stroller as claimed in claim 1, wherein said frame assembly further includes an aligned pair of inclined left and right lower rods, a front wheel unit that is disposed between said left and right lower rods, a handle unit that is connected to upper ends of said lower rods, and two generally vertical rear supporting rods that are connected pivotally to said handle unit at upper ends thereof and that are connected respectively and fixedly to two opposite ends of said pedal-mounting rod at lower ends of said rear supporting rods.

6. The stroller as claimed in claim 1, wherein said coupling mechanism further includes two springs, which bias said push rods toward said brake pedal.

7. The stroller as claimed in claim 6, wherein said coupling mechanism further includes two limiting seats that are fixed respectively to said push rods and that are adjacent to said brake pedal, each of said limiting seats having a sleeving portion that is sleeved fixedly on a respective one of said push rods, and a rearwardly and outwardly inclined limiting plate that extends integrally from said sleeving portion, said control portion of said brake pedal having an upper portion that engages said limiting plates at two opposite sides thereof, a lower portion, and a width along a longitudinal direction of said push rods, which decreases gradually and downwardly, downward turning of said brake pedal resulting in rotation of said control portion about said pedal-mounting rod so as to engage said lower portion with said limiting plates, thereby moving said push rods outwardly.

8. The stroller as claimed in claim 7, wherein each of said limiting plates is formed with a stop projection, which engages a respective one of the opposite sides of said control portion when said brake pedal is turned downward, thereby preventing further rotation of said brake pedal about said pedal-mounting rod.

* * * * *